(12) United States Patent
Hill et al.

(10) Patent No.: US 10,836,878 B2
(45) Date of Patent: Nov. 17, 2020

(54) RAZORS AND RAZOR BLADE CARTRIDGES AND METHODS OF MANUFACTURE THEREFORE

(75) Inventors: Andrew Hill, Beaconsfield (GB); Andrew Honour, Beaconsfield (GB)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 13/637,667

(22) PCT Filed: May 31, 2011

(86) PCT No.: PCT/GB2011/000826
§ 371 (c)(1),
(2), (4) Date: Sep. 27, 2012

(87) PCT Pub. No.: WO2011/151616
PCT Pub. Date: Dec. 8, 2011

(65) Prior Publication Data
US 2013/0008029 A1  Jan. 10, 2013

(30) Foreign Application Priority Data

Jun. 1, 2010 (GB) .................................. 1009019.9

(51) Int. Cl.
*B26B 21/44* (2006.01)
*C08J 7/12* (2006.01)
(Continued)

(52) U.S. Cl.
CPC ........... *C08J 7/123* (2013.01); *B26B 21/4012* (2013.01); *B26B 21/4068* (2013.01); *B26B 21/44* (2013.01); *C08J 7/18* (2013.01)

(58) Field of Classification Search
CPC ......... C08J 7/123; C08J 7/18; B26B 21/4012; B26B 21/4068; B26B 21/44; B26B 21/40
(Continued)

(56) References Cited

U.S. PATENT DOCUMENTS 3,477,127 A * 11/1969 Regan ..................... B26B 19/40
30/41
3,656,234 A * 4/1972 Regan ..................... B26B 19/40
30/537
(Continued)

FOREIGN PATENT DOCUMENTS

GB 2024082 A 1/1980
WO WO 98/58990 * 12/1998 ................ C08J 7/04
(Continued)

OTHER PUBLICATIONS

Arkema, Technical Polymers, DPT/TDS/US37203/Apr. 2010, Apr. 2010, p. 1.*
(Continued)

*Primary Examiner* — Kenneth E Peterson
*Assistant Examiner* — Nhat Chieu Q Do
(74) *Attorney, Agent, or Firm* — Polsinelli PC

(57) ABSTRACT

The invention relates to razors and razor blade cartridges and methods of manufacture therefore including at least one razor blade housing made from polymer material and at least one skin contacting surface, the at least one skin contacting surface being made of a superhydrophillic polymer material. The polymer material has surface properties modified by functionalisation. Preferably the polymer material is a TPU or TPE, with a Rockwell hardness D scale between 30 D and 85 D, a tensile strength between 35 and 80 MPA and a flexural modulas between 40 and 2350 MPA The invention also relates to a method of manufacture of a razor blade cartridge including the steps of moulding a cartridge housing including skin contacting surfaces of polymeric material; subsequently activating the skin engaging surfaces of the polymer using either physical or chemical means to make the surface receptive to the covalent grafting of a monomer, (Continued)

Figure 1:
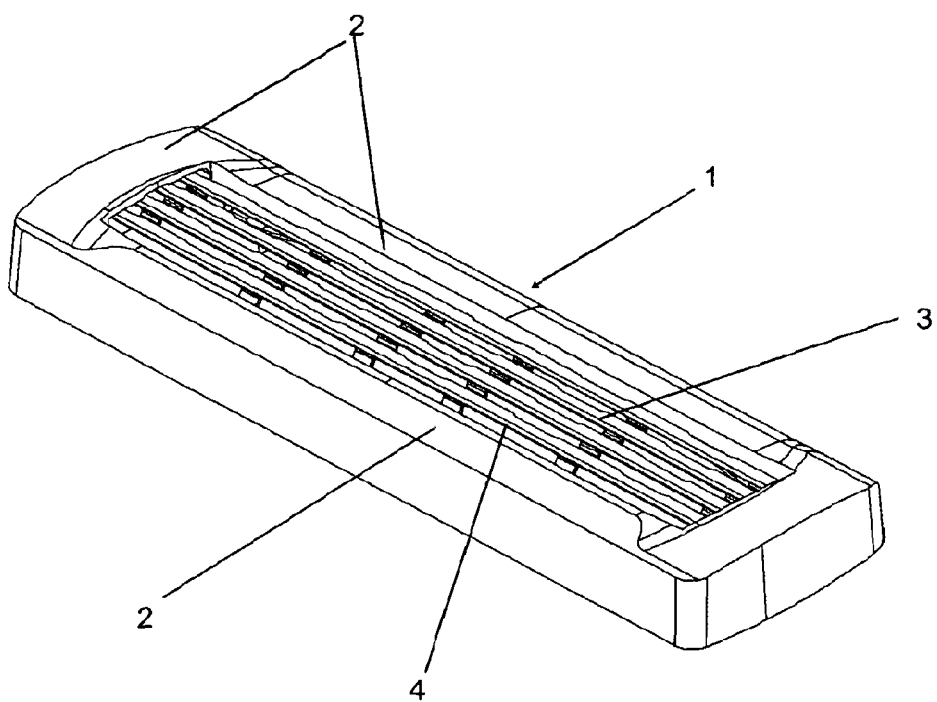

and grafting a functional group onto the surface such as an N-vinyl lactam.

12 Claims, 6 Drawing Sheets

(51) Int. Cl.
*B26B 21/40* (2006.01)
*C08J 7/18* (2006.01)

(58) Field of Classification Search
USPC .............................................. 30/50, 32, 34.2
See application file for complete search history.

(56) References Cited

U.S. PATENT DOCUMENTS

| | | | |
|---|---|---|---|
| 4,875,287 A | 10/1989 | Creasy et al. | |
| 5,005,287 A * | 4/1991 | Ritter ...................... | B05D 5/08 30/41 |
| 5,376,400 A * | 12/1994 | Goldberg et al. ............ | 427/2.24 |
| 5,618,887 A * | 4/1997 | Bamford ............... | A61L 29/041 525/279 |
| 5,711,076 A * | 1/1998 | Yin ..................... | B26B 21/4018 30/41 |
| 6,185,822 B1 * | 2/2001 | Tseng ................... | B26B 21/443 30/41 |
| 6,298,559 B1 | 10/2001 | Kwiecien et al. | |
| 7,696,259 B2 * | 4/2010 | Hanley ................. | A61L 29/085 427/487 |
| 2004/0136944 A1 * | 7/2004 | Anderson et al. .............. | 424/73 |
| 2005/0198842 A1 * | 9/2005 | Walker .................. | B26B 21/225 30/527 |
| 2008/0060201 A1 * | 3/2008 | Kwiecien .............. | B26B 21/443 30/41 |
| 2009/0071007 A1 * | 3/2009 | Bruno ..................... | B26B 21/44 30/34.2 |
| 2009/0188022 A1 * | 7/2009 | Durocher et al. ................ | 2/414 |
| 2011/0017387 A1 * | 1/2011 | Murgida ................. | B26B 21/22 156/242 |
| 2011/0192031 A1 * | 8/2011 | Coresh .................... | B26B 21/22 30/34.2 |

FOREIGN PATENT DOCUMENTS

| | | |
|---|---|---|
| WO | 2007110848 A1 | 10/2007 |
| WO | WO 2007/110848 | 10/2007 |

OTHER PUBLICATIONS http://www.matweb.com/search/datasheet_print.aspx?matguid=0e37a459c4eb452faa9d92659f9a0ccc (Year: 2019).*

International Search Report, International Application No. PCT/GB2011/00826, dated Feb. 9, 2011.

PCT/IB/304, International Application No. PCT/GB2011/000826, dated Jul. 2010.

Office Action of Corresponding Indian Application No. 10830/CHENP/2012 dated Jun. 27, 2017.

* cited by examiner

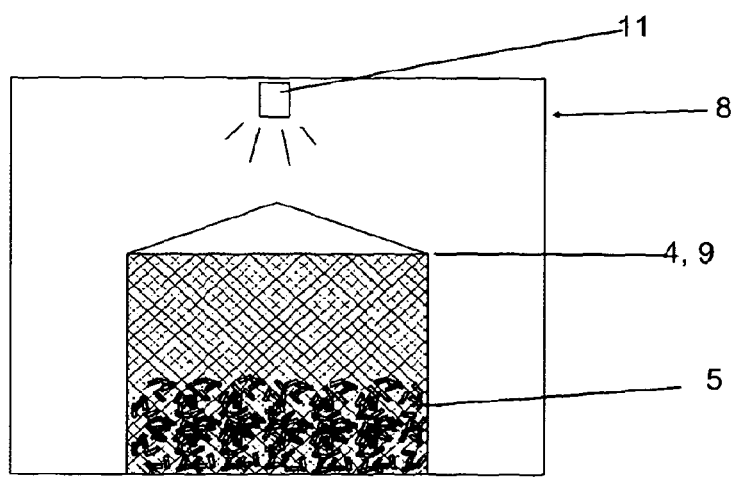
Figure 2.1
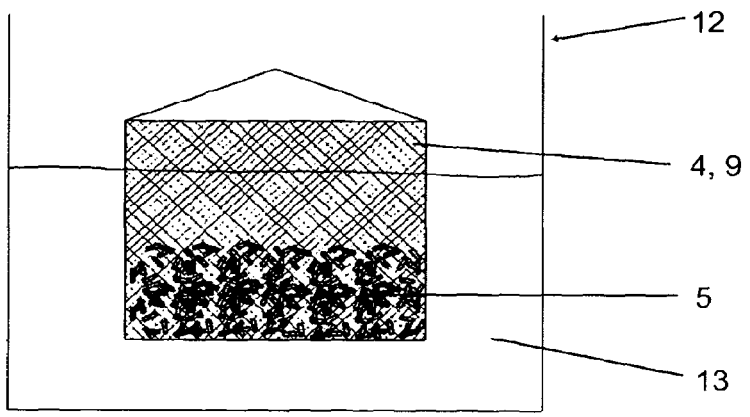
Figure 2.2
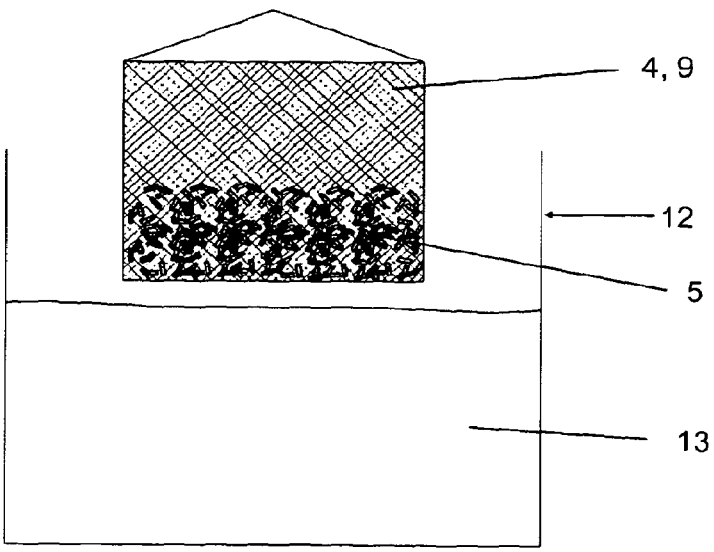
Figure 2.3

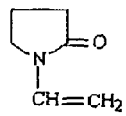

N-Vinyl-2-pyrrolidone (NVP) is a slightly to moderately yellowish liquid. The inherent properties of high polarity, low toxicity, water solubility, chemical stability and pseudo-cationic activity are imparted to its homopolymers and copolymers.

Specifications:
Appearance: Clear, colorless or moderately yellowish liquid
Colour(APHA): 100 max.
Assay(GC): 99.0% min.
2-Pyrrolidone ( GC): 0.2% max.
Water: 0.3% max.
Inhibitor: 0.1% NaOH or 700 ppm NH3

Figure 3

RAZORS AND RAZOR BLADE CARTRIDGES AND METHODS OF MANUFACTURE THEREFORE

CROSS-REFERENCE TO RELATED APPLICATIONS

This application is a National Stage Entry of International application number PCT/GB2011/000826, having an international filing date of May 31, 2011, which was published in English, and which claims priority to Great Britain Patent Application No. GB 1009019.9, filed Jun. 1, 2010, the entireties of which are hereby incorporated by reference as if fully set forth herein.

This invention relates to improved razor blade cartridges and methods of manufacture therefore.

There are a number of known prior art devices which endeavour to provide lubricious properties to the surfaces of a shaving cartridge. For example U.S. Pat. No. 5,005,287 assigned to Wilkinson Sword GmbH describes a process for forming and applying a hydrophilic coating, which is highly slideable when wet, to a plastic or metal part either directly, or indirectly via plastic film, to a safety razor or razor blade unit, in which a solution containing a water-soluble polymer is applied to the plastic or metal part and is cured. The invention also relates to a razor blade unit comprising a blade platform for at least one razor blade, a surface for slidably engaging the skin of a user and a coating on the surface for increasing the slideability of the surface. The coating comprises a water-soluble polymer or copolymer of poly-N-vinylpyrrolidone, at least one radically polymerizable vinyl monomer and a photoinitiator.

A further razor blade cartridge is disclosed in U.S. Pat. No. 5,056,221, also to Wilkinson Sword GmbH. In this disclosure a razor blade unit comprising a support for at least one razor blade and a surface for slidably engaging the skin of a user, and a xerogel on the surface. A process for making a sliding surface on a razor blade unit comprising applying a solution of polyurethane, a water-soluble plastic and a solvent to a surface of the razor blade unit which engages the skin of a user during shaving, and evaporating the solvent to form the sliding surface. The preferred embodiment is to provide the coating on to a strip and to attach the strip to the desired part of the razor blade cartridge. U.S. Pat. No. 4,875,287 to Hydromer Inc. discloses a similar application method.

A more preferred method of applying lubricious surfaces onto razor blade cartridges however has been by securing a coated strip as a physically fixed insert in the razor blade cartridge. This prevents dislodgement of the strip and also is preferable from the point of view of manufacture of each individual cartridge. One such cartridge is disclosed in EP 0715561 to Gillette which describes a shaving unit including a composite that has a surface for engaging the user's skin. The composite contains a water-insoluble resin, a shaving aid, and a water-swellable polymer.

EP 1 055 491 to Warner-Lambert discloses cartridges in which a plastics insert is provided with a lubricious coating. It discloses so-called "Glide" strips for wet shave razors in which the glide strips comprise a mixture of polyurethane and polyvinylpyrrolidone in a ratio of less than 3:1. Glide strips having a ratio within this range provide the benefit of allowing an additive, such as aloe or vitamin E acetate, to be incorporated within the strip in a manner so that it will be capable of depositing the material from the strip on the user's skin during usage. This will provide the benefit to the user of applying a material directly to the skin to enhance the shaving experience. A further embodiment provides a glide strip having a PVP/PUR blend of a certain colour and ratio, which ratio will allow the PVP/PUR blend to erode as the razor is used. Upon the erosion of the PVP/PUR blend, the underlying material, of a different colour than the PVP/PUR, will be exposed and provide an indication to the user that the razor should be replaced.

A disadvantage of these coatings is that there are not very hard wearing and tend to become worn before the full life of the blades is used and this sometimes results in a user disposing of the razor blade cartridge prematurely.

There are numerous patents concerned with the various orientation of the shaving aid strips with respect to the blades as well as to the various active ingredients within the shaving aids leaching out. One such example is U.S. Pat. No. 6,298,559 by Gillette directed to a razor cartridge with a solid polymeric shaving aid strip. The razor cartridge has a solid polymeric shaving aid strip having an upper exposed surface which contacts the skin during shaving. The shaving aid strip includes a first exposed lengthwise-extending portion containing a lubricious water-soluble polymer and an adjacent, second exposed lengthwise-extending portion containing a lubricious water-soluble polymer. The first portion contains a greater amount of the lubricious water-soluble polymer than the second portion, and the first portion is adapted to wear at a faster rate than the second portion during shaving. This construction enables the strip to release more of the lubricious water-soluble polymer for a longer time period (i.e. for more shaves) than conventional shaving aid strips This additional variability of lifetime makes it difficult to balance the respective lifetimes of the shaving aid on the one hand and the blades edges on the other which due to the varying manufacturing tolerances statistically results in a number of blade cartridge being discarded before one of the shaving aid or the blade edge is fully used.

In addition these types of blade cartridges with the shaving aid strips located in close proximity to the blades result in the entrapment of shaving debris and makes the wash through of the debris a more difficult task for the user. In order to wash a razor blade cartridge after use a user is inclined to hold the cartridge under a running tap, so the better the wash through properties of the razor cartridge the less water is consumed.

A further disadvantage of these razor blade cartridges is that they can result in variability of the level of friction during the course of the use of the razor cartridge. This can result from variabilities in the use pattern of the user, the extent of humidity in the bathroom, the relative hardness of the water supply as well as the differences in the beard type and the type and amount of lubricant the user applies to the face. All of these factors can effect the extent of leaching out of the shaving aid active ingredient and general wear and degradation characteristics of the saving aid strip of these conventional razor cartridges.

It is an objective of the present invention to overcome the above disadvantages.

It is therefore and objective of the present invention to proved a razor cartridge which has highly lubricious properties which remain more constant throughout the life of the razor cartridge than current razor cartridges.

It is an objective of the present invention to provide improved razor blades, razor blade cartridges and methods of manufacture therefore in which the friction properties do not become less effective before the blade edge has dulled.

It is a further objective of the present invention to provide improved razor blades, razor blade cartridges and methods of manufacture therefore in which the friction properties remain constant during the different patterns of the user.

It is a further objective of the present invention to provide improved razor blades, razor blade cartridges and methods of manufacture therefore to provide an improved washthrough of the shaving debris and reduce the amount of water consumed during a shave.

According to a first aspect of the invention there is provided a razor blade cartridge including at least one razor blade supported in a housing made from polymer material and at least one skin contacting surface, the at least one skin contacting surface being made of a superhydrophillic polymer material.

According to a first aspect of the invention there is provided a razor blade cartridge including at least one razor blade supported in a housing made from polymer material and at least one skin contacting surface, the at least one skin contacting surface being made of polymer material with surface properties modified by functionalisation.

The polymer material may be any suitable polymer as currently use to make razor blade cartridges such as acrylonitrile butadiene styrene ABS, but also may be any vinyl polymers, nylons, carbonate polymers, aliphatic polymers or the like.

Preferably the polymer material is a TPU or TPE.

Preferably the polymer material has a Rockwell hardness D scale between 30 D and 85 D.

Preferably the polymer material has a tensile strength between 35 and 80 MPA.

Preferably the polymer material has a flexural modulas between 40 and 2350 MPA.

According to a further aspect of the invention there is provided a method of manufacture of a razor blade cartridge including the steps of moulding a cartridge housing including skin contacting surfaces of polymeric material; subsequently activating the skin engaging surfaces of the polymer using either physical or chemical means to make the surface receptive to the covalent grafting of a monomer, and grafting a functional group onto the surface.

Preferably the functional group is an N-vinyl lactam.

The physical activation means may be plasma treatment or the like. The chemical activation means may be exposing the surface to any medium to produce oxygen centred radicals in its surface; such as by exposure to ozone or a peroxidant such as peroxydisulphate in an aqueous solution.

Figure 4:
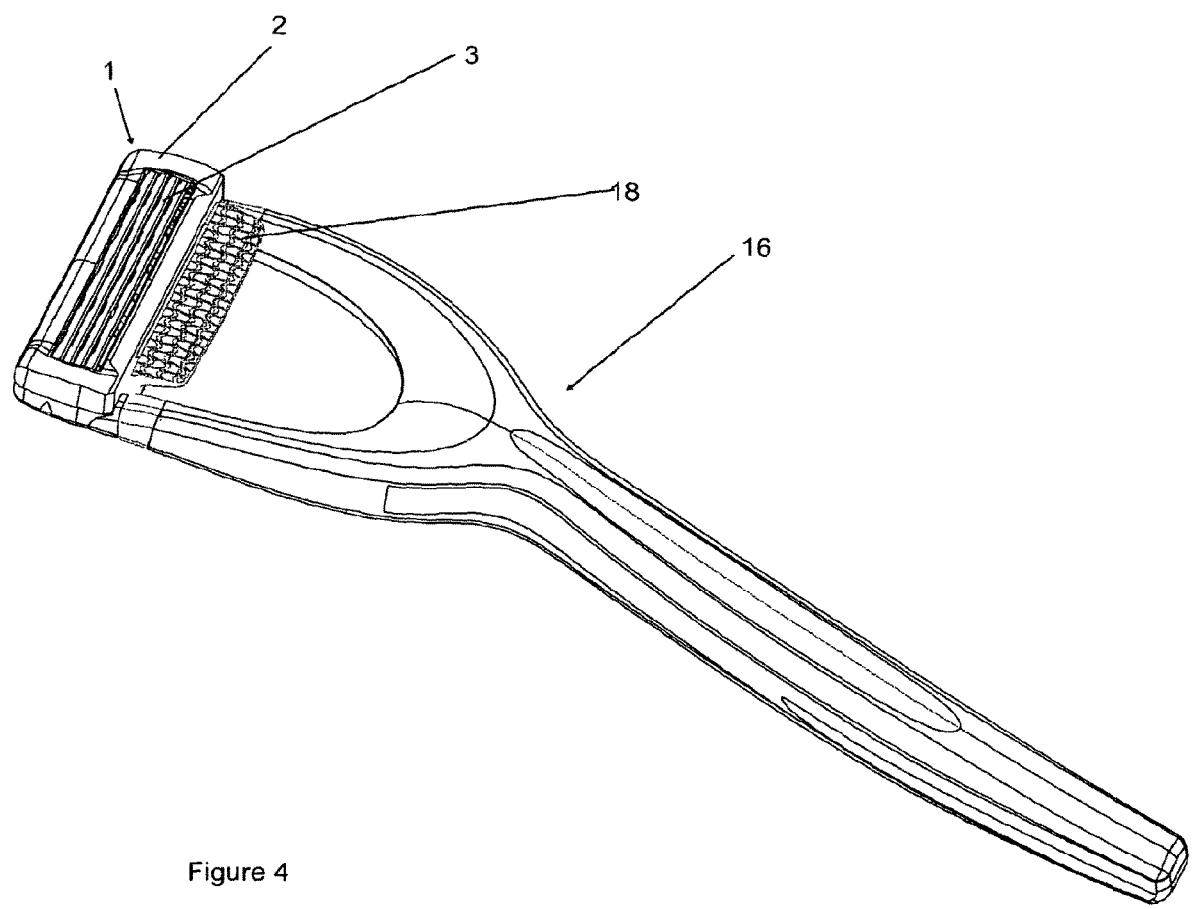
Figure 5:
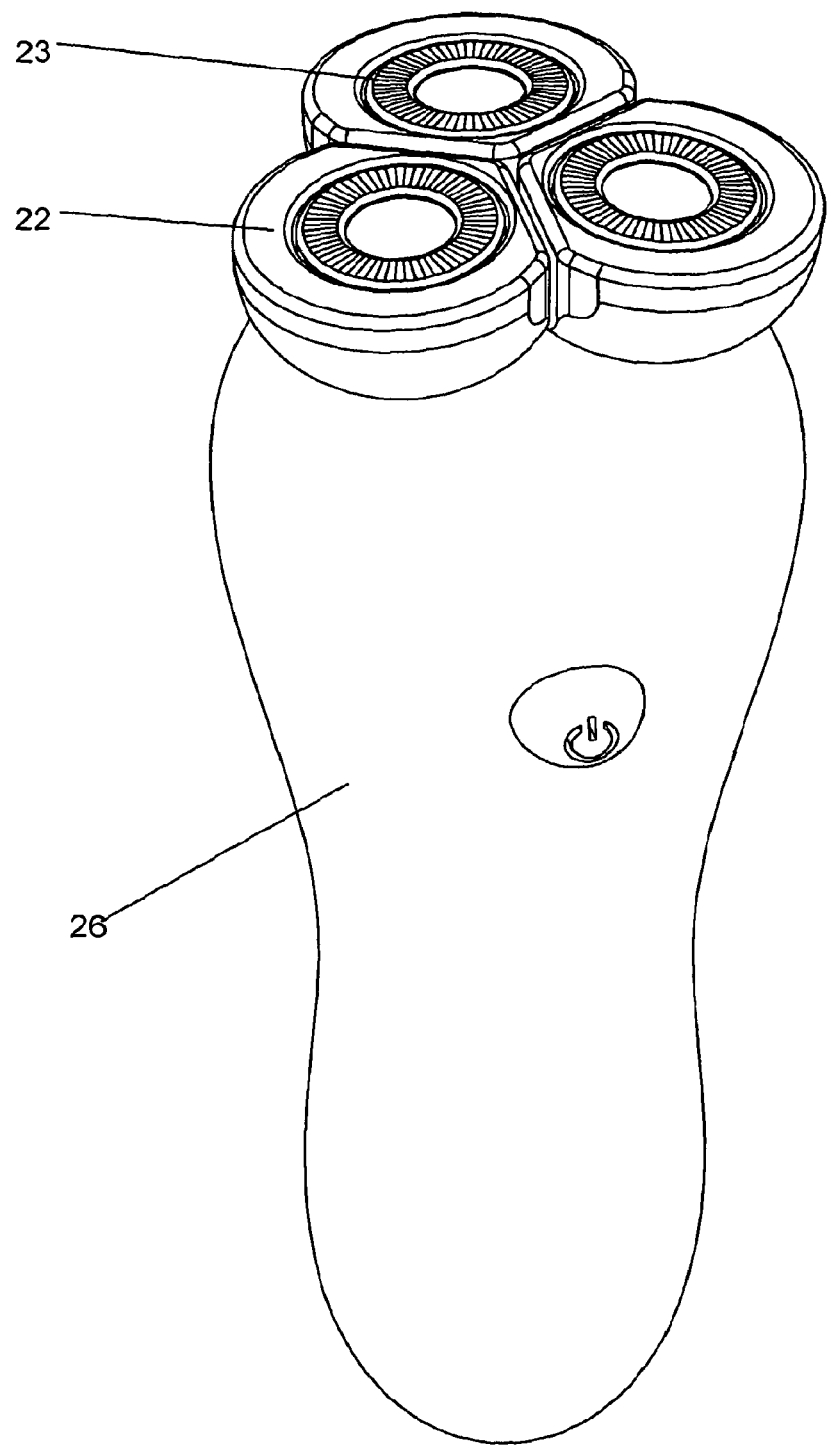
Figure 6:
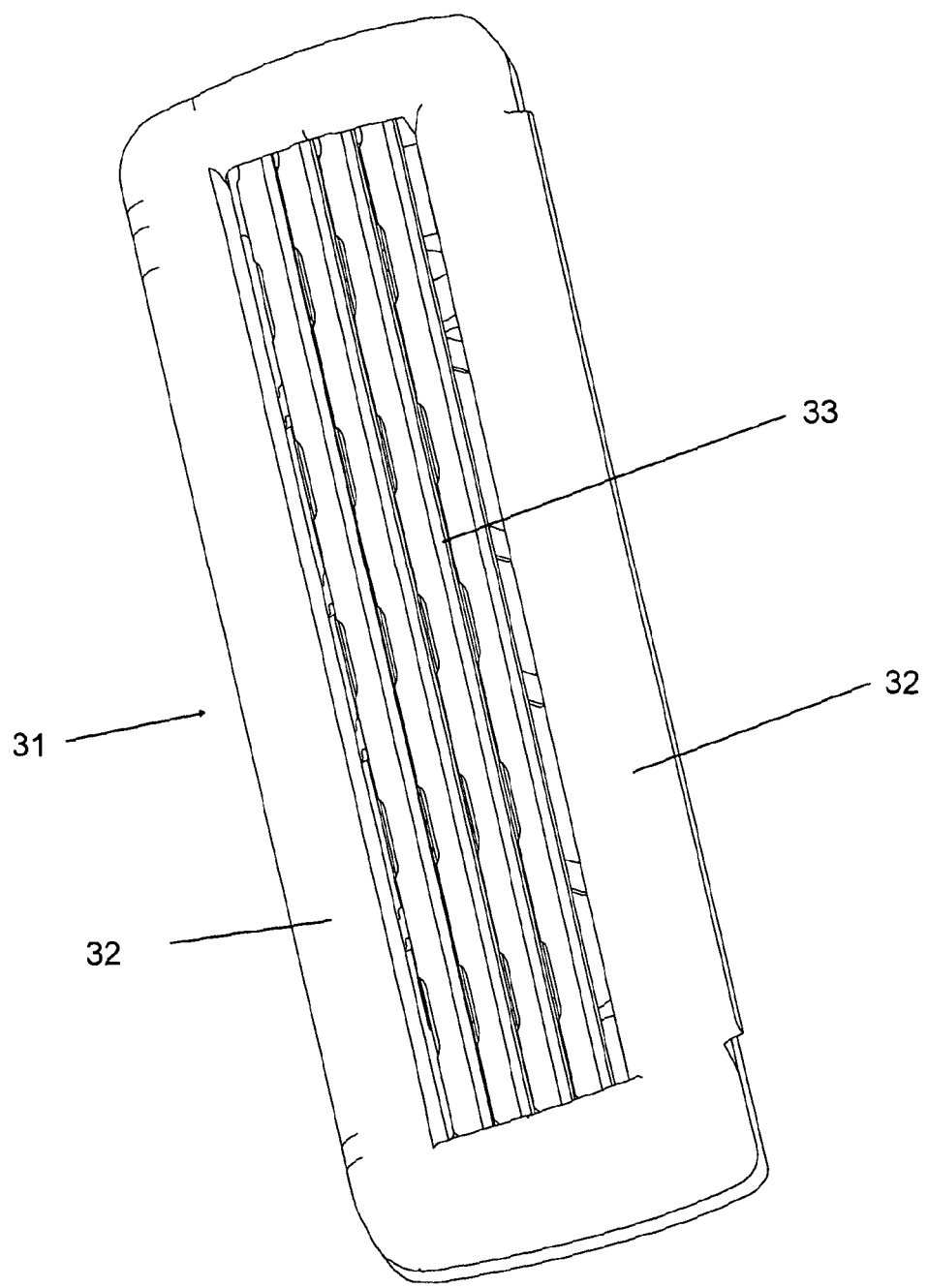

A number of embodiments on the invention will now be described with reference to the figures in which:

FIG. 1 is a razor blade cartridge according to a first embodiment of the invention with the blades set shown separately, FIG. 2.1 shows a first activation step according to a first embodiment of the method of the invention, FIG. 2.2 shows a further grafting step according to a first embodiment of the method of the invention, FIG. 2.3 shows a further draining step according to a first embodiment of the method of the invention, FIG. 3 shows the chemical formula for N-vinylpyrrolidone according to an embodiment of the invention, FIG. 4 shows a completed razor blade cartridge and handle according to a first embodiment of the invention, and FIG. 5 shows an electrically powered shaver including components made using the method of the invention.

In a first embodiment of the invention a razor blade cartridge 1 includes a cartridge housing 5 including skin engaging surfaces 2 and razor blades 3. The housings 5 are moulded from aerylonitrile butadiene styrene (ABS), ABS is a very common commercially available polymer and it will be appreciated that any other suitable polymer having the required properties of a razor blade cartridge may be used. As shown in FIG. 1 the housing 5 and blade set 3 components of the razor blade cartridge 1 are made separately and assembled together to form the complete razor blade cartridge. The cartridge housing 5 is injection moulded and a plurality of the housings 5 are collected in a receiving bin 4.

According to one embodiment of the invention the material selected for the razor blade cartridge is an elastomeric material, preferably selected from one of the materials:

Texin RxT90A, a tradename of Bayer Material Science AG

Hardness 30 D (Scale D Rockwell hardness)

Tensile strength 40.7 MPA

Flexural Modulas 41.4 MPA

Type: TPU (Thermoplastic polyurethane), polyether based.

Pearlthane D16N60D, a tradename of Merquinsa.

Hardness: 63 D

Tensile Strength: 40 MPA

Type: TPU, Polyester Based

Pearlthane 11t65D, a tradename of Merquinsa

Hardness: 64 D

Tensile Strength: 35 MPA

Type: TPU, Polycaprolactone copolyester based

Pebax 7033, a tradename of Arkema

Hardness 69 D (Scale D Rockwell hardness)

Tensile strength 57.2 MPA

Flexural Modulas 462 MPA

Type: TPE, Made from flexible polyether and rigid polamide.

Pebax 7233

Hardness 72 D (Scale D Rockwell hardness)

Tensile strength 63.5 MPA

Flexural Modulas 738 MPA

Type: TPE, made from flexible polyether and rigid polamide.

Texin HM1206

Hardness 85 D (Scale D Rockwell hardness)

Tensile strength 76 MPA

Flexural Modulas 2321 MPA

Type: TPU, Polyester Based

Referring to FIG. 2.1, before assembly of the razor blade cartridge 1 the receiving bin 4 containing just the cartridge housings 5 is transferred to the plasma activation station and enclosed in a plasma activation chamber 8. In the chamber 8 the housings 5 are exposed to a weakly ionised oxygen plasma from a plasma emitter 11. Such weakly ionised oxygen plasma treatment is a known technique for the activation of polymers in general and is used for example in the chrome plating of plastics for example for the car industry.

Following activation for approximately 30 mins in the plasma chamber 8, the plasma exposure is stopped and the chamber opened and the receiving bin containing the housings 5 removed. The housings 5 are then transferred to a mesh basket 9 having a mesh size which is sufficiently small to prevent the cartridges from escaping therefrom. The mesh basket 9 and housings 5 are then moved to a grafting station where the basket is dipped into a vat 12 of N-vinylpyrrolidone 13 as shown in FIG. 2.2. The exposure time in the vat 12 is 10 to 20 minutes after which time the basket 9 is removed from the vat 12 and allowed to drain as shown in FIG. 2.3. The basket 9 may be gently shook or vibrated during the exposure time to maximize the exposure to all parts of the housings 5. The vat 12 may include heating means to maintain the temperature above room temperature.

The exposure time will depend upon the temperature chosen. The N-vinyl-2-pyrrolidone (NVP) is commercially available and the chemical formula and specification is shown in FIG. 3. N-Vinyl-2-pyrrolidone (NVP) is a slightly to moderately yellowish liquid. The inherent properties of high polarity, low toxicity, water solubility, chemical stability and pseudo-cationic activity are imparted to its homopolymers and copolymers.

Specifications:

Appearance: Clear, colourless or moderately yellowish liquid

Colour(APHA): 100 max.

Assay(GC): 99.0% min.

2-Pyrrolidone (GC): 0.2% max.

Water: 0.3% max.

Inhibitor: 0.1% NaOH or 700.ppm NH3

An additional or alternative grafting monomer that has been found to be particularly effective for the method and articles of the invention is an acrylamide such as N-N dimethyl acrylamide, which is readily commercially available.

In a further embodiment of the method of the invention the housings 5 may be collected directly into the basket 9 immediately after being moulded.

Subsequently the housings are dried in a drying station (not shown) after which they are ready to be assembled with the blades 3 as shown in FIG. 4.

It will be appreciated that it is also possible for there to be skin engaging surfaces 18 on what is normally referred to as the razor handle 16. In this case it is perfectly possible within the scope of the present invention for the razor handles to take the place of the housing in the first embodiment. In this case however it would be essential that the razor handles are in two part form and only one of the two parts will be subject to activation and grafted of the superhydrophilic coating of the present invention. The other part remaining untreated and preferably made from a highly grippable polymer. A razor handle made entirely of treated polymer would cause difficulties in the user being able to hold the handle effectively.

In an alternative embodiment the razor handle is made from first and second materials in a two shot moulding process as is already known with one of the materials providing enhanced grip for the user. In this embodiment a first material is made from a polymer which is responsive to the activation and grafting stages described above and results in its surface becoming superhydrophilic whereas the second material is made from a polymer which is not responsive to the activation and or grafting stages remains non-superhydrophilic.

Alternatively it will also be appreciated that it would be possible to mask those parts of the razor handle that aren't desired to be treated either from the activation stage or the grafting stage or both.

In a further embodiment the skin contacting components of an electric dry shaver as shown in FIG. 5, are treated by the method of the invention. It has become apparent that some users prefer to use electrically powered shavers in the wet environment of a shower or by a basin. Such shaving can no longer accurately be called dry shaving, and is instead more accurately referred to as electrically powered shaving. The inventor has discovered that whilst shaving using an electrically powered shaver, in which shearing, rather than cutting, blades are completely protected by a foil, significant beneficial effects are achieved by coating the skin contacting parts of the powered shaver with the method of the present invention. Thus the foil parts 23 and the other skin contacting parts 22 of the powered shaver 26 are subject to the same process as the housing 1 as described above, and subsequently assembled to form the complete shaver.

Further embodiments include alternative methods for the activation stage which include corona discharge or ozone treatment or chemical activation means such as peroxy disulphates. With chemical activation means an additional drying step would be required before the grafting stage.

Additionally further embodiments include the grating of alternative vinyl monomers with similar suitable highly hydrophilic properties such as any N-vinyl lactam to include homopolymers and copolymers of such N-vinyl lactams as N-vinylpyrrolidone, N-vinylbutyrolactam, N-vinylcaprolactam, and the like, or a mixture of other vinyl monomers copolymerizable with the N-vinyl lactams. Of the poly(N-vinyl lactams), polyvinylpyrrolidone (PVP) is preferred.

The invention claimed is:

1. A razor or razor head including at least one razor blade or cutter supported in a housing including top, bottom, and side surfaces, the housing being made from a water-insoluble polymer material and comprising at least one skin contacting element, the at least one skin contacting element consisting essentially of the water-insoluble polymer material having a hydrophilic surface created by activating at least the entire top surface by one of exposing the skin contact element to a medium or via plasma exposure to produce oxygen centered radicals and a functional group selected from an N-vinyl lactam or an acrylamide grafted directly thereon, wherein the water insoluble polymer material is one of a thermoplastic polyurethane and thermoplastic elastomer.

2. The razor or razor head according to claim 1, wherein the water-insoluble polymer material is activated using a physical activation means.

3. The razor or razor head according to claim 2, wherein the water-insoluble polymer material is activated using a chemical activation means.

4. The razor or razor head according to claim 1, wherein the water-insoluble polymer material has a rockwell hardness D scale between 30D and 85D.

5. The razor or razor head according to claim 1, wherein the water-insoluble polymer material has a tensile strength between 35 and 80 megapascal.

6. The razor or razor head according to claim 1, wherein the water-insoluble polymer material has a flexural modulus between 40 and 2350 megapascal.

7. The razor or razor head according to claim 1, wherein the activated surface of the water-insoluble polymer material includes exposure of the polymer material to a non-ionic gaseous medium or a peroxidant.

8. A razor or razor head including at least one razor blade or cutter supported in a housing including top, bottom, and side surfaces, the housing being made from a water-insoluble polymer material and including at least one skin contacting element, the at least one skin contacting element comprising the water-insoluble polymer material having a hydrophilic surface created by activating at least the entire top surface of the water-insoluble polymer by one of exposing the skin contacting element to a medium or via plasma exposure to produce oxygen centered radicals and a functional group selected form N-vinyl lactam or an acrylamide grafted directly thereon, wherein the water-insoluble polymer material is one of a thermoplastic polyurethane and a thermoplastic elastomer.

9. The razor or razor head according to claim 8, wherein the activated surface of the water-insoluble polymer material includes exposure of the water-insoluble polymer material to a non-ionic gaseous medium or a peroxidant.

10. The razor or razor head according to claim 9, wherein the non-ionic gaseous medium includes ozone, said peroxidant includes peroxydisulphate.

11. The razor or razor head according to claim 8, wherein the water-insoluble polymer material is selected from the group consisting of acrylonitrile butadiene styrene, vinyl polymers, nylons, carbonate polymers, and aliphatic polymers.

12. The razor or razor head according to claim 8, wherein the water-insoluble polymer material has a Rockwell hardness D scale between 30 D and 85 D, a tensile strength between 35 and 80 mega Pascal, and a flexural modulas between 40 and 2350 mega Pascal.

* * * * *